United States Patent
Brandt

[11] 3,805,311
[45] Apr. 23, 1974

[54] SCRAPER DEVICE
[75] Inventor: Harry William Brandt, Wilmington, Del.
[73] Assignee: E. I. du Pont de Nemours and Company, Wilmington, Del.
[22] Filed: Sept. 8, 1972
[21] Appl. No.: 287,348

[52] U.S. Cl. .......................................... 15/104.16
[51] Int. Cl. ............................................. B08b 9/02
[58] Field of Search....... 15/104.01, 104.05, 104.16, 15/104.19, 242; 90/243, 24 C, 52, 30, 31; 166/174, 176

[56] References Cited
UNITED STATES PATENTS
527,972  10/1894  Hanson ........................... 15/104.16
731,190   6/1903  Kuhlman ......................... 15/104.16
2,129,091  9/1938  Jacobson ........................ 15/104.16
3,280,415 10/1966  Moore et al. .................. 15/104.16 X Primary Examiner—Edward L. Roberts

[57] ABSTRACT

A scraper device adapted for insertion into continuous tubular structures for removing obstructions therein is provided, said scraper device includes a body element of preferably circular configuration providing a circumferential wall, an annular recess in said circumferential wall, and a circular blade element disposed within said annular recess, wherein said body element when secured centrally to a long extension may be inserted into a continuous tubular structure such as a pipe and impacted against obstructions adhered to the wall of said pipe for removing said obstructions.

4 Claims, 5 Drawing Figures

SCRAPER DEVICE

FIELD OF THE INVENTION

The present invention relates to an article of manufacture and, more particularly, is directed to a novel device for removing obstructions or obstacles disposed internally of tubular pipe structures.

BACKGROUND OF THE INVENTION

Shaped structures such as pipe and pipe fittings of organic polymeric material such as polyethylene have become widely known and used for diverse purposes such as for conveying fluids. Piping systems of organic polymeric material have been found to be desirable especially in view of the ease with which such systems may be fabricated. For example, pipe fittings and pipe may easily be assembled together by utilizing chemical solvents, adhesives or heating treatments for joining these pieces, e.g., polyethylene pipe fittings may be joined to polyethylene pipe by heating the fitting and the pipe before assembly to melt the polyethylene at the region or surface of each piece to be contacted folfowed by mating the heated surfaces of each piece and cooling the heated pieces whereby to effect fusing of the polyethylene to provide a structure of integral or unitary construction. Such pipe and pipe fittings have been found to be especially useful in relining sewer mains.

For example, existing sewer mains of, for example, concrete, clay, or cast iron pipe often become unserviceable because a pipe section either decays or is physically damaged as by breaking due to dynamic earth stresses acting thereon. Rehabilitating unserviceable sewers by replacing defective sewer components is extremely difficult and expensive. These drawbacks can be avoided by inserting polyethylene pipe into existing sewer mains. This is easily accomplished by effecting only a few excavations at widely spaced points along a sewer main and penetrating the main at these points and inserting thereinto a continuous length of polyethylene pipe. These lengths of polyethylene pipe may be connected at their respective ends by conventional fusing techniques to provide a continuous pipe encompassed within the existing sewer main. A method and apparatus for relining sewer pipe are disclosed in, for example, U.S. Pat. No. 3,602,263.

A disadvantage and drawback of the continuous plastic pipe is that a bead or ring of plastic material is formed around the periphery of the joint between two adjacent pipes when these are connected by conventional butt welding or fusing techniques. Specifically, when connecting successive plastic pipes by fusing the ends together, the ends of the pipes to be joined are first heated and then contacted together under pressure followed by cooling while maintaining the pipe ends pressed together so that the ends of the pipe fuse or weld together to provide a unitary structure. During this process a peripheral bead or ring of polymeric material forms on both the inside and outside surfaces of the pipe at the weld line or joint between the pipes as a result of the force or pressure applied to the pipes for fusing the heated and softened ends thereof together. The peripheral bead or ring is analogous to the "flash" material that results from molding operations. The internal bead or ring is objectionable because presenting an obstruction or obstacle in the pipe which could contribute to blockage of the pipe, as may readily occur in, for example, pipe utilized for sewer service if the internal pipe surface is not relatively smooth and free of protuberances or obstructions. Accordingly, a principal object of the present invention is to provide a device for easily and efficiently removing obstructions or obstacles disposed internally on the wall of tubular pipe structures.

THE INVENTION

According to the present invention there is provided a scraper device for insertion into tubular pipe structures for removing obstructions therein wherein said scraper device comprises a body element having severing means disposed on at least one surface thereof.

In one embodiment, the scraper device has a body element of circular configuration providing a circumferential wall and an annular recess in said circumferential wall in combination with a circular severing blade disposed within said annular recess.

DETAILED DESCRIPTION

The nature and advantages of the invention will be more clearly understood by the following description and the several views illustrated in the accompanying drawings wherein like reference characters refer to the same parts throughout the several views and in which.

Figure 1:
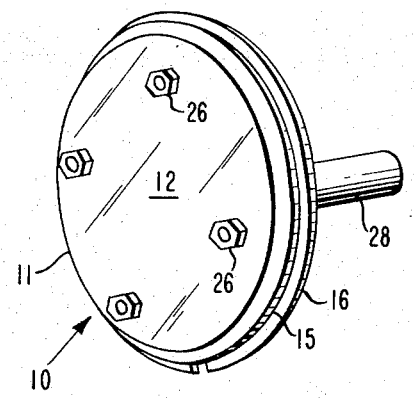
FIG. 1 is a perspective view of the scraper device of the invention.
Figure 2:
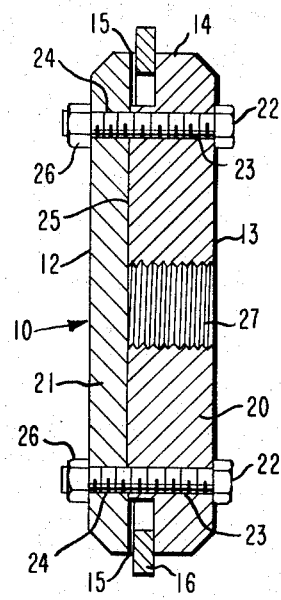
FIG. 2 is a side cross-sectional view of the scraper device of the invention.
Figure 3:
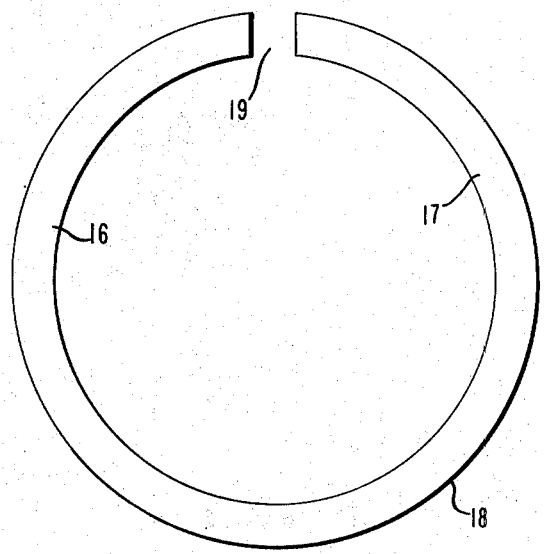
FIG. 3 is a front view of the blade element of the scraper device of the invention.

The scraper device 10 herein disclosed in illustration of the invention, as depicted in FIGS. 1 and 2, includes a body element 11 of circular or disc-like configuration having planar end faces 12 and 13 and circumferential wall 14. An annular recess 15 is provided in circumferential wall 14 of body 11 that extends around the entire periphery of wall 14. Annular recess 15 is adapted to receive and accommodate a circular blade element 16. The blade element 16 has an internal diameter 17 less than or smaller than the diameter of peripheral wall 14, and the outer diameter 18 of circular blade 16 is greater than the diameter of peripheral wall 14 of body element 11. As shown in FIG. 2, circular blade 16 is disposed in annular recess 15 in a manner so as to "float" in the recess for free movement therein within the confines of the walls of the annular recess. Circular blade 16 is preferably provided with a gap spacing 19 so that the blade is not continuous, i.e., blade 16 preferably does not form a closed ring structure.

FIG. 2 depicts a preferred form of scraper device 10 wherein the body element 11 thereof comprises mating discs 20 and 21 that are secured together by means of bolts 22 that extend through aligned openings 23 and 24 in each of disc elements 20 and 21, respectively. As shown in FIG. 2, disc element 20 is provided with a central raised portion or boss 25 which serves to provide annular recess 15 when disc elements 20 and 21 are secured together. The same result could be achieved by replacing boss 25 with separate spacer or washer elements between disc elements 20 and 21 each having planar internal surfaces. The embodiment of the scraper device shown in FIG. 2 is easily assembled by placing circular blade 16 over the boss 25 of disc element 20 and then placing disc element 21 on boss 25 so that openings 24 in disc element 21 are aligned with openings 23 in disc element 20. Bolts 22 are inserted through the respective openings 23 and 24 to receive nuts 26 which upon being threaded onto bolts 22 firmly secure the entire assembly in cooperative relation.

A circular opening 27, preferably threaded, is provided centrally of disc element 20, and opening 27 is adapted to accommodate the end, also preferably threaded, of rod element 28. Rod element 28 affords suitable means for using scraper device 10 in the manner explained next herebelow.

In use, scraper device 10, secured by appropriate means to the end of rod 28, is inserted into a tubular pipe and is advanced within the tubular pipe to the peripheral bead at the weld line therein between two successive pipes that have been joined by the above-described butt fusion technique. The peripheral bead at the weld line of the pipes is removed by impacting the scraper device 10 thereagainst. This may conveniently be done by delivering several sharp blows as by any suitable means, such as a hammer, upon the end of rod 28 which extends beyond and outside the pipe. The force imparted by such blows is transmitted to the scraper device and then directly to the peripheral bead at the weld line between the two successive pipes with the net result that the peripheral bead separates from the internal wall of the continuous pipe in a clean and efficient manner. In fact, the diameter of the continuous pipe at the weld line is substantially the same as the internal diameter of the individual pipes that constitute the continuous pipe, and the wall of the continuous pipe at the weld line is smooth and completely or substantially completely free of obstructions at that location. Satisfactory results have been obtained by using a scraper device with a circular cutting element having an outside diameter between about one-eighth and about one-quarter inch less than the inside diameter of the tubular pipe into which the scraper device is inserted. To illustrate, a scraper device with a circular blade of about 7.96 inches has been used successfully to remove the bead at the weld line of Aldyl brand of polyethylene pipe having an inside diameter of about 8 inches.

Figure 4:
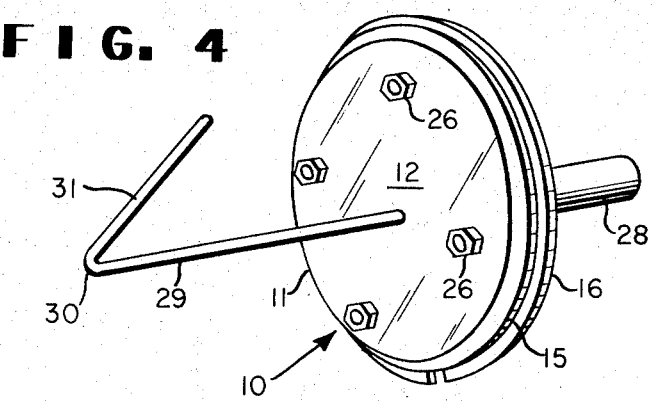
FIG. 4 is a perspective view similar to FIG. 1 showing means extending from one face of the scraper device for retrieving and removing the peripheral bead of plastic after it has been severed from the weld line of abutting pipe ends.

The embodiment of the scraper device of the invention shown in FIG. 4 includes means such as rod 29 for withdrawing from the pipe structure the peripheral bead that has been severed by the scraper device. Rod 29 is preferably threaded at one end for engagement with a correspondingly threaded aperture in face 12 of scraper device 10 for securing rod 29 to the scraper device. Rod 29 extends outwardly from face 12 of scraper device 10, and rod 29 contains a bend 30 so as to provide an extension 31 which forms an acute angle with respect to rod 29. In use, the peripheral bead of plastic material that is severed by scraper device 10 is engaged by rod 29 which functions as a hook for withdrawing the severed peripheral bead upon removing scraper device 10 from the interior of the tubular pipe.

Figure 5:
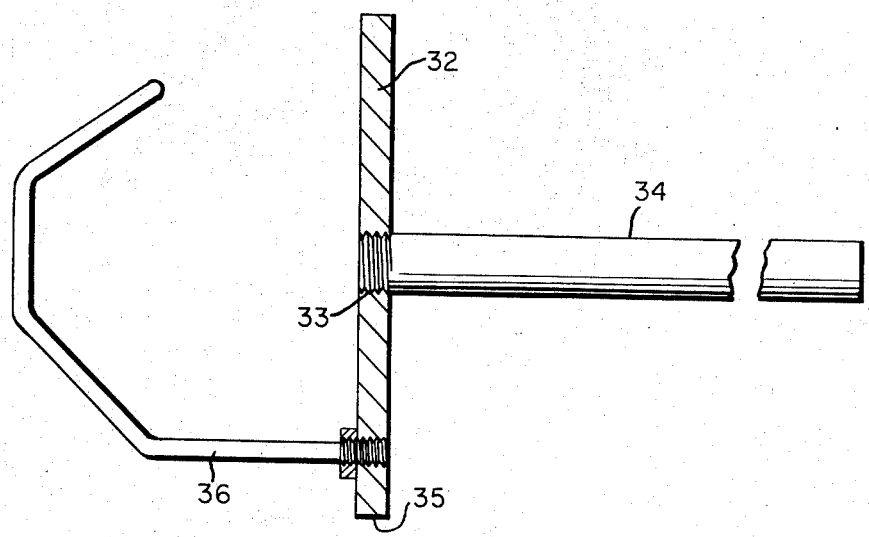
FIG. 5 is a side view in cross-section of another embodiment of the scraper device of the invention.

FIG. 5 illustrates another embodiment of the scraper device of the invention which in this instance comprises a circular plate or body element 32 having a threaded central aperture 33 adapted to threadably engage the correspondingly threaded end of rod 34. Circular plate 32 has a circumferential wall 35 which extends around the entire periphery thereof, and plate 32 also has secured to it means such as rod 36 which extends outwardly from the end face of plate 32 and functions in the same manner as rod 29 of scraper device 10 described immediately hereabove. Circumferential wall 35 of body element 32 constitute severing means which function in a manner similar to circular blade element 16 described hereinabove for removing the peripheral bead between successive plastic pipes that have been butt welded or fused together.

What is claimed is:

1. An article of manufacture comprising a scraper adapted for insertion into tubular pipe, structures for removing obstructions therein, said scraper comprising a body element of circular configuration having a circumferential wall including an annular recess in said circumferential wall and severing means comprising a circular blade disposed in said annular recess.

2. The article of claim 1 wherein said circular blade has an inner diameter less than the diameter of said peripheral wall and an outer diameter greater than the diameter of said peripheral wall.

3. The article of claim 2 including means connected to said body element for advancing said scraper internally of a continuous tubular pipe structure.

4. The article of claim 3 wherein said scraper includes means secured to said body element and extending therefrom so constructed and arranged as to engage and remove the peripheral bead severed by said scraper.

* * * * *